United States Patent [19]

Hauenstein et al.

[11] Patent Number: 5,662,832

[45] Date of Patent: Sep. 2, 1997

[54] BLENDED COMPOSITION OF 2-METHYLPROPENYL-TERMINATED POLYISOBUTYLENE WITH POLYDIMETHYLSILOXANE

[75] Inventors: Dale Earl Hauenstein; Thomas Matthew Gentle; Linda Denise Kennan, all of Midland; Paul Joseph Popa, Auburn, all of Mich.

[73] Assignee: Dow Corning Corporation, Midland, Mich.

[21] Appl. No.: 317,272

[22] Filed: Oct. 4, 1994

[51] Int. Cl.$^6$ ............................................. B01D 19/04
[52] U.S. Cl. ............................................. 252/321; 252/358
[58] Field of Search ............................. 252/321, 358; 585/10

[56] References Cited

U.S. PATENT DOCUMENTS

| | | | |
|---|---|---|---|
| 2,356,367 | 8/1944 | Wright | 252/29 |
| 2,375,007 | 5/1945 | Larsen | 252/48 |
| 2,398,187 | 4/1946 | McGregor | 252/78 |
| 2,466,642 | 4/1949 | Larsen | 252/29 |
| 2,773,034 | 12/1956 | Bartleson | 252/32.7 |
| 3,328,482 | 6/1967 | Northrup | 260/825 |
| 3,697,440 | 10/1972 | Lichtman | 252/321 |
| 3,816,313 | 6/1974 | Szieleit | 252/49.6 |
| 3,959,175 | 5/1976 | Smith, Jr. | 252/321 |
| 4,059,534 | 11/1977 | Morro et al. | 252/32.7 |
| 4,097,393 | 6/1978 | Cupper et al. | 252/78.3 |
| 4,514,319 | 4/1985 | Kulkarni | 252/321 |
| 5,152,925 | 10/1992 | Furman | 252/321 |
| 5,229,033 | 7/1993 | Nguyen et al. | 252/358 |
| 5,507,960 | 4/1996 | Popa et al. | 428/411.1 |
| 5,514,419 | 5/1996 | Popa et al. | 427/389 |

FOREIGN PATENT DOCUMENTS

| | | |
|---|---|---|
| 1100931 | 5/1981 | Canada. ........................ 253/64 |
| 163398 | 12/1985 | European Pat. Off. . |
| 502603 | 9/1992 | European Pat. Off. . |
| 516109 | 12/1992 | European Pat. Off. . |
| 529161 | 3/1993 | European Pat. Off. . |
| 1490240 | 12/1973 | United Kingdom . |

OTHER PUBLICATIONS

"Encyclopedia of Polymer Science and Technology", John Wiley & Sons, Inc., NY, NY, pp. 427 1987 month unknown.
Amoco Material Safety Data Sheet; Issued May 16, 1994 Copyright–1995 American Chemical Society.
Amoco Chemical Company/Bulletin 12–M "Amoco Polybutene"; (1990) month unknown.
BASF "Oppanol B1 and Oppanol B3"; Jul. 1985.
Synthetic Lubricants and High–Performance Functional Fluids, Marcel Dekker, Inc., (1993) month unknown p. 279.
The Panalane Advantage, Amoco, (1992) month unknown, pp. 2–8.
Macromolecules, vol. 8, No. 3, May–Jun. 1975, pp. 371–373.
Traslation JD 63–199277, Takamori Tech. Traslation Services (Aug. 17, 1988).
Polymer Blends, by Sonja Krause, vol. I, (1978) month unknown, p. 86.
The Miscibility of Polymers: I. Phase Equilibria in Systems Containing Two Polymers and a Mutual Solvent, by Allen, Gee and Nicholson, (1959) month unknown, pp. 56–62.
The Miscibility of Polymers: II. Miscibility and Heat of Mixing of Liquid Polyisobutenes and Silicones, by Allen, Gee and Nicholson, (1960) month unknown. pp. 8–17.

*Primary Examiner*—Richard D. Lovering
*Assistant Examiner*—Daniel S. Metzmaier
*Attorney, Agent, or Firm*—Alexander Weitz

[57] ABSTRACT

A composition is disclosed, said composition comprising (A) a polydimethylsiloxane having a viscosity greater than about 2 cS at 25° C.; and (B) a polyisobutylene oligomer having a number average molecular weight of about 200 to about 2,300 and having at least one end terminated with a 2-methylpropenyl group.

22 Claims, 1 Drawing Sheet

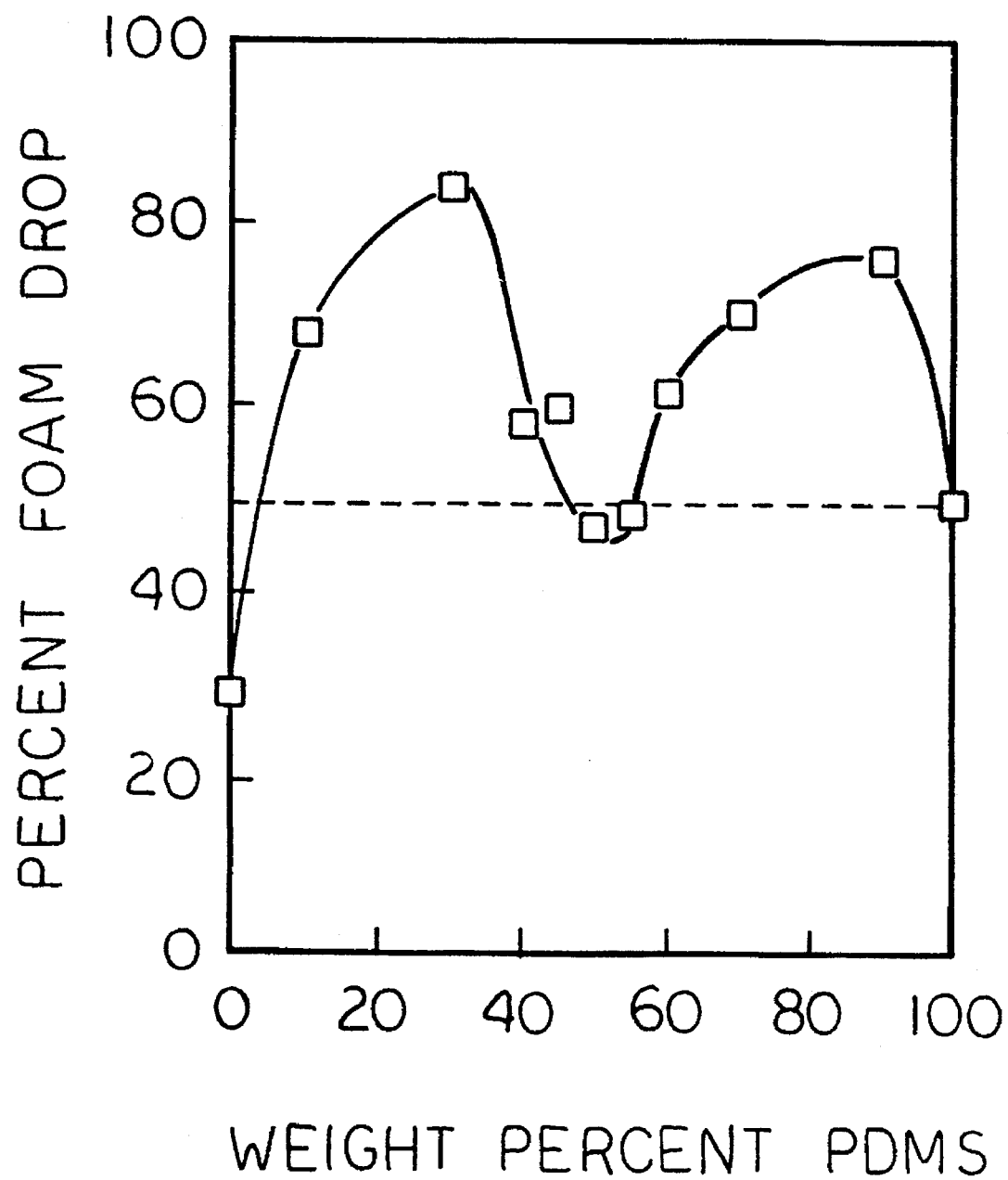

BLENDED COMPOSITION OF 2-METHYLPROPENYL-TERMINATED POLYISOBUTYLENE WITH POLYDIMETHYLSILOXANE

FIELD OF THE INVENTION

The present invention relates to an antifoaming composition. More particularly, the invention relates to a composition comprising a blend of a polydimethylsiloxane oil and a polyisobutylene oligomer having at least one end terminated with a 2-methylpropenyl group.

BACKGROUND OF THE INVENTION

Polydimethylsiloxane oils, particularly when formulated with a silica powder, are known for their ability to reduce frothing or foaming in aqueous systems. There are also examples in the art where organic formulations have been used to control foam in such systems. Such antifoaming or defoaming agents find utility in many industrial processes, some of which would be highly impractical were the agent not available.

Antifoam agents containing both organic and silicone components are also known in the art. For example, U.S. Pat. No. 3,959,175 to Smith et al. discloses a defoamer based on a mixture of polyisobutylene and a high melting hydrophobic component, such as fatty amide, fatty acid or triglyceride, or a mixture of the polyisobutylene and a hydrophobic material such as treated silica powder. Combination of the above three ingredients is also taught by Smith et al. This prior art patent incorrectly includes silicone oil as a member of the aforementioned "high melting" component which is said to have a melt point above 40° C. (the typical melting point of a polydimethylsiloxane oil is actually about −40° C.). This patent illustrates the invention with examples wherein silicone oil is used, albeit at levels of no more than 0.5 percent. The viscosity of the silicone oil used is not stated and no criticality thereof is suggested by Smith et al. Likewise, the polyisobutylene taught is shown to have particular end groups of the formula —$CH_2C(CH_3)$=$CH_2$, and there is no suggestion to alter this group.

SUMMARY OF THE INVENTION

The present inventors have now discovered that certain blends of polydimethylsiloxane (PDMS) oils and polyisobutylene (also referred to as polybutene or PIB herein) have antifoaming activity which is superior to either of these individual components. Blends wherein the polyisobutylene has at least one terminal 2-methylpropenyl group in its molecule have been found to be significantly better antifoams for aqueous detergent foaming systems than comparable blends wherein both terminal groups are saturated hydrocarbon groups, such as those having the structure —$C(CH_3)_3$ or —$CH_2CH(CH_3)_2$. The former structure is that normally present on one terminus of the PIB as typically prepared in commerce. The latter structure is almost identical with that of the end group taught by Smith et al., cited supra. It is considered quite surprising that such a subtle change in the end groups can result in the improved defoaming performance of the blends wherein the polyisobutylene has an 2-methylpropenyl end group.

The synergistic antifoam activity observed when the instant blends are used to defoam an aqueous foaming system may be further augmented by the incorporation of a fine silica powder. This further serves to reduce the concentration of antifoam agent required to defoam a particular foaming system.

The present invention therefore relates to an antifoam composition comprising:

(A) a polydimethylsiloxane having a viscosity greater than about 2 cS at 25° C.; and (B) a polyisobutylene oligomer having a number average molecular weight of about 200 to about 2,300 and having at least one end terminated with a 2-methylpropenyl group, wherein the weight ratio of (A) to (B) is 1:99 to less than 50:50 or said ratio is greater than about 55:45 to 99:1.

The invention further relates to a method for defoaming a foaming system using the above described composition.

BRIEF DESCRIPTION OF THE DRAWINGS

FIG. 1 is a plot of the percent foam drop at 24 hours as a function of polydimethylsiloxane content in blends of polydimethylsiloxane and 2-methylpropenyl-terminated polyisobutylene.

DETAILED DESCRIPTION OF THE INVENTION

The polydimethylsiloxane (A) of the invention is a homopolymer or copolymer having a viscosity at 25° C. which is greater than about 2 cS wherein up to about 15 mole percent of diorganosiloxane units may be copolymerized with the dimethylsiloxane units. It has been found that when the viscosity of the polydimethylsiloxane is $\leq 2$ cS the antifoam activity of the instant blends is not improved over the corresponding polydimethylsiloxane polymer itself. On the other hand, when the viscosity of this component is more than about 2 cS, a synergistic effect is obtained wherein the antifoaming activity of the composition is superior to either the pure polydimethylsiloxane or the pure PIB components. There is no critical upper limit of the polydimethylsiloxane viscosity and it is only limited by practical mixing considerations, but is preferably no more than about 100,000 cS.

The organic groups of the above mentioned diorganopolysiloxane units are independently selected from alkyl radicals having 1 to 16 carbon atoms, phenyl radical or halogenated alkyl radicals having 3 to 6 carbon atoms or alkylene oxide groups, such as ethylene oxide, propylene oxide or copolymeric combinations thereof.

The nature of the terminal groups on the polydimethylsiloxane component (A) is not critical for the purposes of the present invention and these may be inert groups, such as trimethylsiloxy, dimethylphenylsiloxy and diethylphenylsiloxy. They may also be illustrated by groups such as dimethylvinylsiloxy, dimethylhexenylsiloxy, dimethylhydroxysiloxy, dimethylhydrogensiloxy, dimethylalkoxysiloxy, methyldialkoxysiloxy and trialkoxysiloxy, wherein the alkoxy groups are preferably methoxy. Most preferably, component (A) is a polydimethylsiloxane homopolymer having trimethylsiloxy terminal units.

Component (A) is well known in the art and is generally available commercially.

Component (B) of the invention is a polyisobutylene oligomer having a number average molecular weight (MW) of about 200 to about 2,300, preferably about 200 to about 800 and most preferably about 300 to about 400. The polyisobutylene oligomer must have least one 2-methylpropenyl terminal group of the structure —HC=C($CH_3$)$_2$. Again, the specific polymers and oligomers described above can be prepared by methods known in the art. Such oligomers are known in the art and many are available commercially in a variety of molecular weights from the Amoco Chemical Company under the trade name Indopol™, these being referred to as "vinyl" terminated in the company's literature.

For the purposes of the present invention, the weight ratio of component (A) to component (B) is such that the antifoam activity of the blend of (A) and (B) is greater than that of either (A) or (B) alone, as determined by the percent foam drop in a simple shake test, described infra. Generally, this ratio is between about 1:99 and about 99:1, with the exception of a narrow region in which the improved antifoam activity is not observed. Thus, the improved antifoam activity is observed when the PDMS/PIB weight ratio is 1:99 to less than about 50:50 or when this ratio is greater than about 55:45 to 99:1. Preferably, the weight ratio of (A) to (B) is about 10:90 to about 40:60 or it is about 60:40 to about 90:10. Most preferably, the weight ratio of (A) to (B) is about 10:90 to about 30:70 or about 70:30 to about 90:10.

In addition to components (A) and (B), the instant compositions preferably also contain (C), a fine powdered silica component. The addition of silica further augments the antifoam activity of the instant compositions. Component (C) can be a precipitated or fumed silica is treated with, e.g., a silane or siloxane agent to render it hydrophobic, as commonly practiced in the art. Examples of such treating agents include hexamethyldisiloxane, trimethylchlorosilane and low molecular weight silanol-terminated polydimethylsiloxane, preferably hexamethyldisilazane. Preferably, this component is a silica having a surface area in the range of 50 to 400 $m^2$/gram, most preferably 50 to 150 $m^2$/gram. The silica can be pre-treated or treated in-situ.

In order to prepare the instant antifoam compositions, components (A), (B) and, optionally, component (C) are blended to form a homogeneous mixture. Any suitable means for mixing such systems may be used (e.g., low shear mixers, vortex mixer) and the order of addition is not critical. Typically, components (A) and (B) are added to component (C) and the latter is then uniformly dispersed in the combination of (A) and (B).

In the method of the present invention, the above described composition is added to a foaming system, preferably an aqueous foaming system, in an amount sufficient to reduce foaming, as determined by routine experimentation. Typically, the amount of the antifoam composition used in such a foaming system is approximately 1 to 14,000 parts per million (ppm) based on the weight of the foaming system. When silica (C) is not included in the composition, this range is preferably about 400 to about 8,000 ppm, most preferably about 800 to about 4,000 ppm.

When silica (C) is added in the instant compositions, the above discussed region of exclusion (i.e., wherein improved antifoam activity is not observed) is not generally found. In this case, the antifoam activity of blends containing (A), (B) and (C) is generally superior to that of blends of only (A) and (C) or blends of (B) and (C) over the full range of (A):(B) weight ratios (i.e., 1:99 to 99:1). The silica, when added, is preferably present at a level which results in a silica concentration of no more than about 140 ppm (by weight) in the foaming system, preferably no more than about 130 ppm. Preferably, up to about 50%, more preferably up to about 35% and most preferably up to about 3%, of the silica is present based on the total weight of components (A), (B) and (C). It has been found that addition of greater amounts of silica in the preferred aqueous foaming systems does not improve the efficiency of the antifoam composition beyond that of PDMS-silica mixtures. Thus, for example, when the total antifoam concentration of the antifoam composition is more than about 4,000 ppm, the silica content is preferably no more than about 3% based on the combined weight of components (A) and (B) and (C). For the above recited preferred range of antifoam concentration in a foaming system, the silica is preferably used at a level of up to 1 percent based on the total weight of (A), (B) and (C). The skilled artisan will readily determine the optimum amount of silica by routine experimentation.

In a preferred embodiment of this method, the foaming system comprises aqueous surfactant media, such as aqueous detergents encountered in laundry and dishwashing applications. The compositions are also suitable as antifoams in pulp and paper production. Additionally, the instant method may be used to defoam other foaming systems, such as found in petroleum and petrochemical processing, solvent-based inks and paints and in chemical processing.

EXAMPLES

The following examples are presented to further illustrate the composition and method of this invention, but are not to be construed as limiting the invention, which is delineated in the appended claims. All parts and percentages in the examples are on a weight basis and all measurements were obtained at a temperature of 25° C., unless indicated to the contrary.

The activity of antifoam compositions, described infra, were determined by a shake test as follows. An aqueous detergent stock solution was prepared by adding 20 drops (0.45 gram) of DAWN™ Original Scent dishwashing liquid (Proctor & Gamble, Cincinnati, Ohio) to 345 ml of warm tap water and mixing thoroughly. Twenty ml (19.7 g) aliquots of the above stock solution were placed into 9.5 dram vials, filling each vial about half way. An antifoam composition was added to each vial at the level indicated in the tables below. In each shake test series at least one vial did not contain antifoam agent and this served as a control for the series. In the shake test procedure a vial was lifted to a position above the operator's ear and then shaken by extending the arm in a "throwing" motion (approximately a 2 foot extension), then returning to the initial position. Ten such shake cycles were used in each case, with a slight pause between cycles, all within a span of 5 seconds. After shaking, the vial was placed on a laboratory bench top and observed as a function of time, as shown in the tables below.

The activity of a given antifoam composition after a given time interval was obtained according to the following formula: % drop in foam height=100 (T - F)/(T - L)

wherein T=8.4 cm =maximum height of liquid plus foam in the vial (i.e., when empty portion of vial is completely filled with foam)

F=liquid plus foam height at a given time

L=liquid height=4.4 cm

From the above formula it is seen that, when foam fills the empty portion of the vial, as in the case of the controls immediately after shaking, T=F and the % drop is zero. Likewise, when all the foam has collapsed after a given time interval, F=L and the drop is 100%. Thus, a larger value of the % drop (for a given time of rest after shaking) indicates improved defoaming activity. The values of F obtained herein represent an average of three measurements, each at a different location around the vial.

Series 1

Polysynlane™ PIB and trimethylsiloxy-terminated PDMS having a viscosity of 350 cS (350 $mm^2$/sec) were blended in the ratios shown in the first column of Table 1a to form comparative antifoam agents and these were evaluated according to the above shake test. Polysynlane™ is described as a saturated polyisobutylene having a number average molecular weight of about 320 (MW=380 by gel permeation chromatography) and having one terminal group of the formula

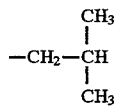

the other terminal group being of the formula —$C(CH_3)_3$. It is a product of Polyesther Corporation, Southhampton, N.Y. The measured total concentration of the antifoam blend (or pure PIB or PDMS) in the foaming system is shown in the second column of Table 1a (ppm=parts per million). The % drop in foam height at three different times is reported in the last three columns. For the purposes herein, the term "immediate" indicates measurement within 10 seconds.

TABLE 1a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 25 |
| 100/0 | 4023 | 22 | 27 | 60 |
| 0/100 | 4162 | 0 | 0 | 33 |
| 90/10 | 4112 | 21 | 22 | 51 |
| 70/30 | 4114 | 14 | 14 | 50 |
| 50/50 | 4132 | 22 | 23 | 49 |
| 30/70 | 4208 | 19 | 19 | 51 |
| 10/90 | 4036 | 14 | 15 | 58 |

From Table 1a it is seen that the antifoam activity of these blends is generally lower than that of the pure PDMS component (i.e., weight ratio=100/0) for all times. Similar results were obtained when this series was repeated, in this case the total antifoam composition level ranging from 3,890 to 4,069 ppm.

This series also included evaluation of the above compositions wherein 3% of each blend was replaced with QUSO™ WR55 FG silica powder. QUSO™ WR55 FG is described as a synthetic, amorphous, precipitated, PDMS-treated silica having a typical surface area of 90 m²/g and marketed by Degussa Corporation, Dublin, Ohio. The results are presented in Table 1b.

TABLE 1b (3% silica in antifoam composition)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 25 |
| 100/0 | 4061 | 97 | 98 | 100 |
| 0/100 | 4086 | 38 | 40 | 100 |
| 90/10 | 4079 | 95 | 97 | 100 |
| 70/30 | 4135 | 95 | 97 | 100 |
| 50/50 | 4081 | 95 | 95 | 100 |
| 30/70 | 4137 | 95 | 95 | 100 |
| 10/90 | 4059 | 93 | 93 | 100 |

From Table 1b it is again seen that the antifoam activity of these comparative blends is generally lower than that of the pure PDMS component. In this case, however, the introduction of silica results in good performance for most of the compositions.

Series 2

The comparative evaluations using the Polysynlane™ PIB and PDMS of Series 1 were repeated wherein the total concentration of the antifoam blend was reduced, as indicated in Tables 2a and 2b.

TABLE 2a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 26 |
| 100/0 | 736 | 23 | 28 | 57 |
| 0/100 | 822 | 0 | 0 | 8 |
| 90/10 | 736 | 0 | 0 | 39 |
| 70/30 | 756 | 11 | 13 | 49 |
| 50/50 | 731 | 0 | 0 | 25 |
| 30/70 | 761 | 4 | 7 | 44 |
| 10/90 | 741 | 0 | 0 | 29 |

TABLE 2b (3% silica in antifoam agent)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 26 |
| 100/0 | 726 | 84 | 86 | 100 |
| 0/100 | 777 | 11 | 16 | 100 |
| 90/10 | 716 | 67 | 70 | 100 |
| 70/30 | 761 | 85 | 86 | 100 |
| 50/50 | 746 | 75 | 78 | 100 |
| 30/70 | 771 | 79 | 81 | 100 |
| 10/90 | 746 | 76 | 78 | 100 |

From Tables 2a and 2b it is seen that the same general trend as found in Series 1 was obtained at the lower antifoam concentrations (i.e., the addition of this PIB to PDMS generally detracts from the antifoam performance of the latter for all time intervals under consideration).

Series 3

Antifoam agents of the present invention were prepared as described in Series 1 using Indopol™ L-14 PIB in place of the Polysynlane™. Indopol™ L-14 is described as a vinyl-terminated polyisobutylene oligomer having a number average molecular weight of about 320 and is a product of the Amoco Chemical Company, Chicago, Ill. One terminal group of this oligomer has the vinyl-like structure —HC=$C(CH_3)_2$ (i.e., 2-methylpropenyl) and the other terminal group has the formula —$C(CH_3)_3$.

The results of the shake test using antifoam concentrations similar to those of Series 1a are presented in Table 3a.

TABLE 3a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 0 |
| 100/0 | 4059 | 18 | 23 | 49 |
| 0/100 | 4079 | 0 | 0 | 29 |
| 90/10 | 4162 | 33 | 35 | 76 |
| 70/30 | 4096 | 45 | 48 | 70 |
| 60/40 | 4112 | 27 | 28 | 61 |
| 55/45 | 4102 | 10 | 16 | 48 |
| 50/50 | 4102 | 18 | 19 | 47 |
| 45/55 | 4117 | 21 | 23 | 60 |
| 40/60 | 4162 | 19 | 22 | 58 |
| 30/70 | 4127 | 28 | 28 | 84 |
| 10/90 | 4132 | 25 | 29 | 68 |

Table 3 demonstrates that compositions of the invention have greater antifoam activity than either pure PDMS or pure PIB. This improvement is observed either immediately, or at longer time intervals, within certain proportions of the two components. In this particular case, the improvement is generally observed when the two components are combined, with the exception of a narrow region in which the PDMS/PIB weight ratio is greater than about 45:55 to less than about 55:45. This can be better appreciated from the graphical representation of the data of Table 3a in FIG. 1. In this graph, the percent foam drop (at 24 hours) is plotted against the weight percent of the PDMS component, the dotted line at 49% being indicative of the pure PDMS antifoam activity.

The compositions of Series 3a were modified with 3% silica, as described in Series 1b. Evaluation of these antifoams is reported in Table 3b.

TABLE 3b (3% silica in antifoam composition)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 28 |
| 100/0 | 4264 | 97 | 98 | 100 |
| 0/100 | 4340 | 64 | 68 | 100 |
| 90/10 | 4225 | 98 | 100 | 100 |
| 70/30 | 4256 | 98 | 98 | 100 |
| 50/50 | 4257 | 98 | 98 | 100 |
| 30/70 | 4239 | 98 | 98 | 100 |
| 10/90 | 4244 | 97 | 97 | 100 |

From Table 3b it is seen that the antifoam activity of the blends is not better than that of the PDMS alone when each system is modified with silica at this total level of antifoam composition.

Series 4

Antifoam compositions of the invention based on the PDMS and PIB used in Series 3, above, were again evaluated and the results are presented in Table 4.

TABLE 4

(no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 1 | 19 |
| 100/0 | 3823 | 9 | 12 | 37 |
| 0/100 | 4580 | 0 | 0 | 23 |
| 99/1 | 3856 | 5 | 5 | 51 |
| 90/10 | 3984 | 31 | 33 | 63 |
| 70/30 | 3952 | 24 | 26 | 50 |
| 50/50 | 4058 | 0 | 3 | 36 |
| 30/70 | 3987 | 4 | 7 | 54 |
| 10/90 | 3916 | 0 | 1 | 43 |
| 1/99 | 3853 | 1 | 1 | 51 |
| 0/100 | 3890 | 0 | 0 | 28 |

Again, it is seen that the blends of the invention had improved antifoam activity, either immediately or at longer time intervals, except at the PDMS/PIB ratio of 50/50.

Series 5

Evaluation of antifoam compositions similar to those of Series 3 and Series 4 were repeated wherein the total concentration of the antifoam blend in the foaming system was reduced, as indicated in Tables 5a and 5b.

TABLE 5a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 13 |
| 100/0 | 786 | 27 | 29 | 54 |
| 0/100 | 848 | 0 | 0 | 39 |
| 90/10 | 787 | 22 | 24 | 60 |
| 70/30 | 771 | 33 | 35 | 62 |
| 50/50 | 807 | 29 | 33 | 59 |
| 30/70 | 832 | 16 | 18 | 63 |
| 10/90 | 843 | 5 | 7 | 82 |

TABLE 5b (3% silica in antifoam agent)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (control) | — | 0 | 0 | 13 |
| 100/0 | 731 | 87 | 88 | 100 |
| 0/100 | 863 | 43 | 45 | 100 |
| 90/10 | 761 | 95 | 95 | 100 |
| 70/30 | 756 | 95 | 95 | 100 |
| 50/50 | 782 | 95 | 95 | 100 |
| 30/70 | 802 | 95 | 95 | 100 |
| 10/90 | 833 | 90 | 91 | 100 |

From Table 5a it is seen that, at this lower total antifoam level, the improvement in activity of the instant blends over either PDMS or PIB is deminished. However, when silica is added, the improvement over PDMS/silica-blends is still apparent. This trend was observed at still lower total antifoam levels (approximately 200 ppm).

Series 6

The effect of the viscosity of trimethylsiloxy-terminated PDMS component on the antifoam performance was determined using the PIB of Series 3, this PDMS viscosity being indicated in the second column of Table 6. In this series of experiments the total antifoam agent concentration was in the range of 4213 to 4508 ppm.

TABLE 6a (no silica)

| Weight Ratio of PDMS/PIB | Viscosity of PDMS (cS) | Drop in Foam Height (%) | | |
|---|---|---|---|---|
| | | Immediate | 4 Hours | 24 Hours |
| 0/0 (Control) | — | 0 | 0 | 26 |
| 0/100 | — | 0 | 0 | 33 |
| 100/0 | 2 | 22 | 28 | 58 |
| 90/10 | 2 | 22 | 31 | 61 |
| 100/0 | 50 | 5 | 6 | 40 |
| 90/10 | 50 | 32 | 35 | 58 |
| 100/0 | 100 | 24 | 28 | 51 |
| 90/10 | 100 | 23 | 30 | 61 |
| 100/0 | 350 | 47 | 49 | 71 |
| 90/10 | 350 | 53 | 57 | 89 |
| 100/0 | 1,000 | 53 | 55 | 78 |
| 90/10 | 1,000 | 62 | 63 | 89 |
| 100/0 | 30,000 | 48 | 50 | 95 |
| 90/10 | 30,000 | 64 | 67 | 98 |

From Table 6a it is seen that the antifoam activity of blends based on PDMS having a viscosity of 2 cS is not improved by the addition of the 2-methylpropenyl-terminated PIB of the invention whereas blends containing PDMS oil having a viscosity of greater than 2 cS show improved performance relative to the corresponding pure PDMS component, either immediately or after longer periods.

The above results were repeated using compositions containing 0.5% of the above described silica and the results of testing at a total antifoam agent concentration of 4239 to 4467 ppm are shown in Table 6b.

TABLE 6b (0.5% silica)

| Weight Ratio of PDMS/PIB | Viscosity of PDMS (cS) | Drop in Foam Height (%) | | |
|---|---|---|---|---|
| | | Immediate | 4 Hours | 24 Hours |
| 0/0 (Control) | — | 0 | 0 | 26 |
| 0/100 | — | 23 | 28 | 100 |
| 100/0 | 2 | 74 | 91 | 100 |
| 90/10 | 2 | 76 | 93 | 100 |
| 100/0 | 50 | 79 | 88 | 100 |
| 90/10 | 50 | 86 | 90 | 100 |
| 100/0 | 100 | 80 | 84 | 100 |
| 90/10 | 100 | 88 | 90 | 100 |
| 100/0 | 350 | 84 | 85 | 100 |
| 90/10 | 350 | 90 | 93 | 100 |
| 100/0 | 1,000 | 90 | 90 | 100 |
| 90/10 | 1,000 | 95 | 96 | 100 |
| 100/0 | 30,000 | 93 | 95 | 100 |
| 90/10 | 30,000 | 95 | 97 | 100 |

It is again seen that the improved antifoam activity is only obtained when the viscosity of the polydimethylsiloxane is greater than 2 cS. At this total antifoam level, a PDMS viscosity of greater than about 1,000 cS does not seem to result in improved activity over the PDMS/silica blend. Similar results were obtained when the silica was present at 0.5% and the total antifoam composition was used at a level of about 350 ppm.

Series 7

Compositions were prepared and tested as above wherein the PDMS had a viscosity of 60,000 cS and the PIB was the same as used in Series 3. The results are shown in Table 7a and 7b (without silica and with 0.5% silica, respectively).

TABLE 7a (no silica)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 28 |
| 100/0 | 355 | 19 | 22 | 47 |
| 90/10 | 421 | 18 | 18 | 33 |
| 100/0 | 4558 | 29 | 29 | 58 |
| 90/10 | 4528 | 50 | 52 | 100 |

TABLE 7b (0.5% silica in antifoam agent)

| Weight Ratio of PDMS/PIB | Antifoam concentration (ppm) | Drop in Foam Height (%) | | |
|---|---|---|---|---|
| | | Immediate | 5 Minute | 24 Hours |
| 0/0 (Control) | — | 0 | 0 | 28 |
| 100/0 | 406 | 73 | 75 | 100 |
| 90/10 | 411 | 75 | 75 | 100 |
| 100/0 | 4695 | 90 | 93 | 100 |
| 90/10 | 4523 | 89 | 91 | 100 |

We claim:

1. A composition comprising:

(A) a polydimethylsiloxane having a viscosity greater than about 2 cS at 25° C.; and (B) a polyisobutylene oligomer having a number average molecular weight of about 200 to about 2,300 and having at least one end terminated with a 2-methylpropenyl group, wherein the weight ratio of said polydimethylsiloxane (A) to said polyisobutylene (B) is within the range of 10:90 to less than 50:50 or said ratio is within the range of greater than about 55:45 to 99:1.

2. The composition according to claim 1, wherein said polydimethylsiloxane (A) is a homopolymer.

3. The composition according to claim 2 wherein the molecular weight of said polyisobutylene (B) is 200 to 800.

4. The composition according to claim 3, wherein said polydimethylsiloxane (A) has trimethylsiloxy terminal groups and has a viscosity of $\geq 50$ cS at 25° C.

5. The composition according to claim 1, wherein the molecular weight of said polyisobutylene (B) is 300 to 400.

6. The composition according to claim 1, wherein the weight ratio of said polydimethylsiloxane (A) to said polyisobutylene (B) is 60:40 to 90:10.

7. The composition according to claim 1, wherein the weight ratio of said polydimethylsiloxane (A) to said polyisobutylene (B) is 10:90 to 30:70.

8. A composition comprising:

(A) a polydimethylsiloxane having a viscosity greater than about 2 cS at 25° C.;

(B) a polyisobutylene oligomer having a number average molecular weight of about 200 to about 2,300 and having at least one end terminated with a 2-methylpropenyl group, wherein the weight ratio of said polydimethylsiloxane (A) to said polyisobutylene (B) is within the range of 10:90 to less than 50:50 or said ratio is within the range of greater than about 55:45 to 99:1; and, optionally, (C) a silica powder, wherein up to 50 percent of said silica is present based on the total weight of components (A), (B) and (C).

9. The composition according to claim 8, wherein said polydimethylsiloxane (A) is a homopolymer.

10. The composition according to claim 9, wherein the molecular weight of said polyisobutylene (B) is 200 to 800.

11. The composition according to claim 10, wherein said polydimethylsiloxane (A) has trimethylsiloxy terminal groups and has a viscosity of 250 cS at 25° C.

12. The composition according to claim 8, wherein the molecular weight of said polyisobutylene (B) is 300 to 400.

13. The composition according to claim 9, wherein up to 3 percent of said silica powder is present based on the combined weight of said polydimethylsiloxane, said polyisobutylene and said silica powder.

14. A composition comprising:

(A) a polydimethylsiloxane having a viscosity greater than about 2 cS at 25° C.; and (B) a polyisobutylene oligomer having a number average molecular weight of about 200 to about 2,300 and having at least one end terminated with a 2-methylpropenyl group, wherein the weight ratio of said polydimethylsiloxane (A) to said polyisobutylene (B) is within the range of 10:90 to 99:1, with the proviso that the antifoam activity of the blend of (A) and (B) is greater than that of either (A) or (B) alone.

15. The composition according to claim 14 wherein said polydimethylsiloxane (A) is a homopolymer.

16. A method for defoaming an aqueous foaming system comprising adding to said foaming system the composition of claim 1.

17. A method for defoaming an aqueous foaming system comprising adding to said foaming system the composition of claim 2.

18. A method for defoaming an aqueous foaming system comprising adding to said foaming system the composition of claim 8.

19. A method for defoaming an aqueous foaming system comprising adding to said foaming system the composition of claim 9.

20. A method for defoaming an aqueous foaming system comprising adding to said foaming system the composition of claim 14.

21. A method for defoaming an aqueous foaming system comprising adding to said foaming system the composition of claim 15.

22. A method for defoaming a foaming system comprising adding to said foaming system the composition of claim 1.

* * * * *